United States Patent [19]
Yip et al.

[11] Patent Number: 5,467,033
[45] Date of Patent: Nov. 14, 1995

[54] CHIP CLOCK SKEW CONTROL METHOD AND APPARATUS

[75] Inventors: Linda Y. Yip, Milpitas; Kinying Kwan, San Jose, both of Calif.

[73] Assignee: Tandem Computers Incorporated, Cupertino, Calif.

[21] Appl. No.: 87,226

[22] Filed: Jul. 2, 1993

[51] Int. Cl.⁶ ............................................... H03K 19/096
[52] U.S. Cl. ................................................ 326/93; 257/208
[58] Field of Search .................................... 307/443, 269, 307/480, 482.1; 326/93; 257/207, 208

[56] References Cited

U.S. PATENT DOCUMENTS

| | | | |
|---|---|---|---|
| 4,769,558 | 9/1988 | Bach | 307/480 |
| 4,812,684 | 3/1989 | Yamagiwa et al. | 307/480 |
| 5,013,942 | 5/1991 | Nishimura et al. | 307/480 |
| 5,045,725 | 9/1991 | Sasaki et al. | 307/443 |
| 5,164,817 | 11/1992 | Eisenstadt et al. | 307/480 |
| 5,172,330 | 12/1992 | Watanabe et al. | 307/482.1 |
| 5,235,521 | 8/1993 | Johnson et al. | 364/488 |
| 5,270,592 | 12/1993 | Takahashi et al. | 307/269 |

*Primary Examiner*—Edward P. Westin
*Assistant Examiner*—Benjamin D. Driscoll
*Attorney, Agent, or Firm*—Townsend and Townsend and Crew

[57] ABSTRACT

A master clock signal, used to operate the clock devices (e.g., flip flops) formed on an integrated circuit chip, includes first and second clock paths. The first clock path is a linear trunk having laterally extending tributaries. The clock trunk is driven, through buffer circuits, at both ends with the master clock, and the internal devices coupled to the tributaries to receive the clock signal. The second path comprises a closed loop formed proximate the periphery of the integrated circuit chip. Clock buffer circuitry receives the master clock signal and apply that master clock signal to two points on the closed loop path. The closed loop path is used to communicate the master clock to only the input/output devices, i.e., those that receive data and/or informational signals from an external source, or that communicate such signals to a destination external to the integrated circuit.

20 Claims, 1 Drawing Sheet

CHIP CLOCK SKEW CONTROL METHOD AND APPARATUS

BACKGROUND OF THE INVENTION

The present invention is directed generally to digital apparatus, and more particularly to a technique for distributing a master clock signal on an integrated circuit chip to minimize clock skew.

Today's microelectronic industry has seen amazing advances in the art of fabricating semiconductor integrated circuits, achieving extremely high device counts for individual integrated circuit chips. However, notwithstanding the very large scale integration capable today, both integrated circuit chips are fabricated with the knowledge that they will be incorporated into yet a larger design. Thus, for example, computing systems are often formed by utilizing even very large scale integrated (VLSI) circuit chips mounted to circuit boards, and interconnected to one another.

More often than not such systems are synchronous in the sense that they include clocked devices (e.g., flip flops or other bi-stable elements) whose state changes will occur, in response to an edge of a clock signal. In such synchronous systems it is often desirable that the individual (integrated circuit) devices or modules provide informational signals (e.g., data, control signals, etc.) or receive such informational control signals synchronously; that is, that the signals be present, or presented, in a steady state condition relative to an edge of the clock signal.

This is sometimes not an altogether easy task, particularly for high frequency operation (e.g., in the mega-hertz range) due to chip skew i.e., difference between a transition of a clock signal applied to a device or chip and a state change of an output signal as a result of the clock transition. For example, a large number of internal (to the device) clock loads (flip-flops) can cause a corresponding large on-chip skew and a chip-to-chip skew due to delay differences at individual clock loads. (Chip-to-chip skew is mainly due to semiconductor process variations and the number of clock loads on different chips, assuming the temperature and supply voltage variations at the system level are negligible.) In order to ensure a proper exchange of data signals between individual devices, on-chip as well as chip-to-chip skew must be controlled.

One solution is to form a phase lock loop (PLL) on each integrated circuit chip. The PLL can be structured to operate to receive the clock signal to produce therefrom a number of synchronous (phase related) clock signals, maintaining a strict phase relationship between the clock signals it produces and the received clock by the chip. Other techniques may require the PLL of one chip to receive the clock signals of other chips with which it will operate in order to maintain a proper phase relationship between the clock it utilizes and the clocks that the other chips utilize.

Depending upon the particular scheme implemented, the use of PLL devices is not without certain problems. Use of a PLL often requires the addition of extra pins to the chip, as well as the addition of extra discrete components (resistors, and capacitors for the loop filter). Also, dedicated (noise free) analog power supply and ground may be needed in the design.

Another approach is to pass data from one clock regime to another clock regime through an intermediate clock regime. This also requires additional circuitry to implement the intermediate clock regime.

SUMMARY OF THE INVENTION

The present invention is directed to a technique for distribution of a clock signal on an integrated circuit chip in a manner that limits the maximum skew a clock signal will experience on that chip, in turn also limiting the maximum chip-to-chip skew in a multiple chip system.

Broadly, the invention includes forming on the chip two separate sets of clock driver circuits for receiving a clock signal at an input terminal of the chip, and for communicating that clock signal to two separate clock paths: a linear path and a closed-loop path. Both paths have the clock signal applied at two points: the linear path receives the clock signal at its two ends; the closed-loop path receives the clock signal at two points of the path substantially diametrically opposite from one another.

In the preferred embodiment of the invention the input/output (I/O) clocked devices (e.g., flip flops) that transfer data from the chip, or receive data communicated to the chips, are all located proximate the closed-loop path and have their clock inputs coupled to receive the clock signal communicated by the closed-loop path. All other clocked devices ("internal devices") have their clock inputs coupled to the linear path by laterally-extending (from the linear path) tributaries.

Further, the closed loop path is structured to present a specific, predetermined load to the clock signal. Thus, if the particular integrated circuit chip with which the invention is used does not have sufficient clock I/O devices to make up the predetermined load, dummy loads are used.

A number of advantages are achieved by the present invention. For example, on-chip and chip-to-chip skews are minimized without the addition of extra pins to the integrated circuit chip, as would be required for certain techniques of PLL usage. Also, no extra discrete components (resistors, capacitors) or extra devices are needed, nor is there any extra power supply and ground necessary.

These and other advantages will become apparent to those skilled in the art upon a reading of the following detailed description of the invention, which should be taken in conjunction with the accompanying drawings.

DESCRIPTION OF THE PREFERRED EMBODIMENT

Figure 1:
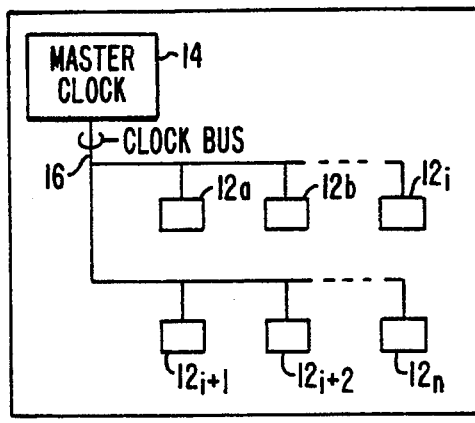
FIG. 1 is a diagrammatic representation of a circuit board, or the like, carrying a number of integrated circuit chips that all receive, from a signal source, a master clock signal.

Turning now to the figures, and for the moment FIG. 1, there is generally illustrated a circuit board, designated by the reference numeral 10. The circuit board 10 could comprise an entire digital system, or form a part of a larger digital system. Relevant here is simply that the circuit board 10 is shown as carrying a number of integrated circuit chips 12 (12a, 12b, ..., 12i, ..., 12n). Certain of the chips may be specially formed, that is they are application specific integrated circuits (ASICs), while others may be generally available off-the-shelf devices such as microprocessors, synchronous random access memory, and/or the like. Not shown in FIG. 1 are the data lines that may interconnect certain of the integrated chip chips 12 to communicate data therebetween.

The board 10 also carries a master clock generator 14 that develops a master clock signal (M_CLK) for delivery, via a clock bus 16, to each of the integrated circuit chips 12 for synchronous operation. (Although not illustrated in FIG. 1, the paths 16 from the clock generator 14 to each of the chips 12 are individually formed, and of equal length, regardless of the location of the chip 12 relative to the clock generator 14.) The integrated circuit chips 12, or at least some of them, will to include edge triggered, clocked devices such as flip flops that will receive and hold state information applied to a data input when the clock input sees a state transition from a low state to a high state, or a high state to a low state.

Those integrated circuit chips 12 that do include clocked devices are formed to operate synchronously in that they will receive the M_CLK signal from the clock generator 14 to perform various operations. The results of those operations, i.e., data or control signals, may be communicated by the particular integrated circuit chip 12 to one or more other of the integrated circuit chips 12. Thus, output signals of a particular integrated circuit chip will change state, relative to the M_CLK signal applied thereto, but with a phase difference (i.e., skew). It is this skew that is sought to be minimized by the present invention.

Figure 2:
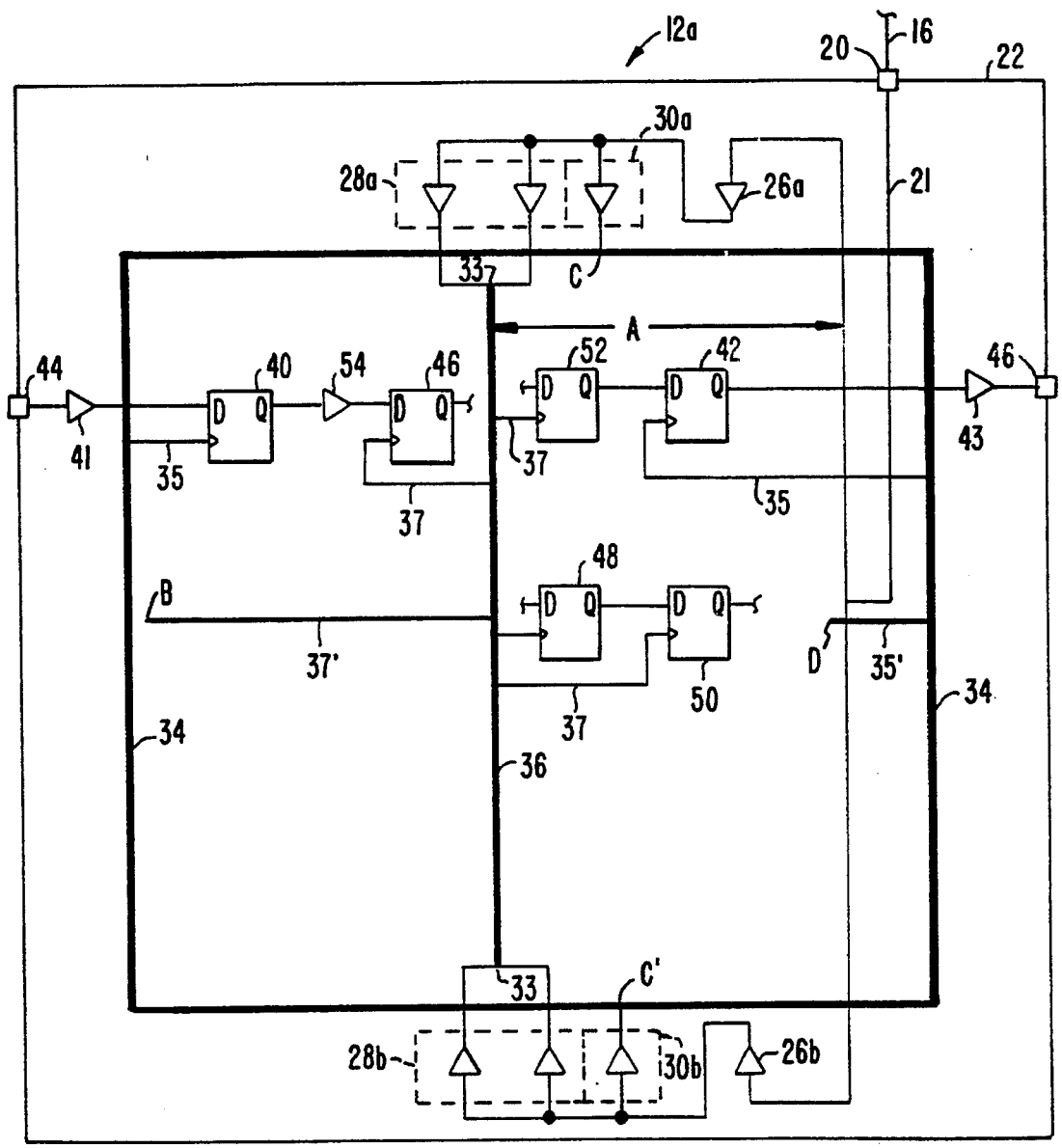
FIG. 2 is a diagrammatic illustration of the clock distribution on an integrated circuit chip, formed according to the teachings of the present invention.

Referring now to FIG. 2, there is illustrated one of the integrated circuit chips 12, (e.g., integrated circuit chip 12a) incorporating the present invention. As FIG. 2 shows, the integrated circuit chip 12a includes a input pad 20 that is formed at the periphery 22 of the integrated circuit chips 12a for receiving the M_CLK signal communicated on the clock bus 16. The input pad 20 is coupled to communicate the M_CLK signal to a pair of pre-driver circuits 26 (26a, 26b). In turn, the pre-driver circuits 26 are each respectively coupled to two sets of driver circuits 28a, 30a and 28b, 30b. The driver circuits 28 comprise a pair of drivers connected in parallel to drive opposite ends 33 of a linear path 36 that is formed substantially in the center of the integrated circuit chip 12a. The driver circuits 30a, 30b are connected to a closed-loop path 34 at points diametrically opposite one another.

Preferably, and as FIG. 2 illustrates, the closed-loop path 34 is formed to be proximate the periphery of the integrated circuit chip 12a. Also, the driver circuits 30 are preferably connected at points on the closed-loop 34 path so that the physical distance from one point of connection of the drivers 30 to the other is substantially equal, regardless of the direction travelled along the loop.

The I/O devices (only a few of which are shown for reasons of clarity—and represented by the flip-flops 40 and 42) are preferably close to the closed loop path 34. The flip flop 40 represents an input device, and is connected to receive data, via receiver buffer 41, that is applied to an input (or input/output) terminal 44. Similarly, the I/O clock device represented by 42 has its data output (Q) coupled to the output (or input/output) pad 46 via a buffer/driver circuit 43. The clock inputs (illustrated as right facing triangles) are connected to the closed-loop path 34 by the tributaries 35.

Internal devices (i.e., those clocked devices that are not I/O devices) do not receive information directly from, or communicate information directly to, points external of the integrated circuit 12 are represented as the flip flops 46, 48, 50, and 52. Internal devices have their clock inputs coupled to the linear path 36 by laterally extending tributaries 37.

The present invention was designed to handle a 25 MHz clock signal. As is known by those skilled in this art, it takes very little to introduce skew in a clock signal of such a frequency when communicating that signal from one point to another. For that reason the path formed on the integrated circuit chip to communicate the clock signal from the input pad 20 to the pre-driver circuits 26a, 26b should be of equal distance. Thus, as FIG. 2 shows, the path from the input pad 20 is brought onto the integrated circuit chip 12 to a central area where it is split so that the actual distance from the pad 20 to each of the amplifiers 26a, 26b will be equal. Further, the two branches of the path 21 are preferably a distance A from the trunk path 36 that is less than 500 microns.

The driver circuits 30 are designed to drive a predetermined clock load. If the actual number of I/O devices (e.g., flip-flops 40–42) is such that the loading is less than that predetermined clock load, "dummy" loads (e.g., inverters—with no operating function) are added in order to establish an equivalent loading substantially equal to that for which the drivers 30 were designed.

The driver pairs 28a, 28b are also designed to be load specific. However, dummy loads are not used for the linear path 36. Rather, if the actual loading (i.e., the actual number of clock inputs coupled to the linear path 36) is less than a predetermined amount, the path from the output of a driver to the linear path 36 of each of the driver pairs is cut so that only one driver communicates the clock signal to each of the ends 33 of the linear path 36. Conversely, of course, if the loading is greater than the predetermined amount, both drivers of each pair couple the clock signal to the ends 33.

It is unavoidable; some clock skew will be present on the integrated circuit chip 12a. For example, there will be a skew between the clock signal applied to one or the other end 33 of the linear path 36 and the clock signal appearing at a point furthest from an end 33: point B, at the end of the tributary 37'. This is the maximum "internal clock skew."

Similarly, there will be point D, at the end of the tributary 35' of the closed-loop path 34 that will be the furthest point from the point C (or C'). The maximum (I/O clock signal) skew experienced by the closed-loop path will be between these points C (or C') and D. These skews must be taken into account when transferring information from an I/O device (e.g., flip-flop 40) to a internal device (e.g., flip-flop 46) by delaying the information transferred by a predetermined amount. This delay is imposed by the inverter 54.

The amount of delay exhibited by the inverter 54 depends upon the maximum and minimum clock skews encountered. This may be explained with reference to FIG. 3, which illustrates one pulse 60 of the I/O clock communicated on the closed loop 34 and a pulse 62 of the internal clock communicated on the linear path 36 and its associated tributaries. Focusing first on the I/O clock 60, the minimum and maximum clock delays 64, 66 are those that would respectively be present at (1) the point that the clock is applied to the closed loop path 34, i.e., point C, and the furthest distance from that point, i.e., point D. Similarly, the clock skew of the internal clock 62 would experience a minimum clock delay 70 at the end point 33 of the linear path 36, and a maximum clock delay 72 at the furthest point from the end of the linear path 36, i.e., point B (at the end of the tributary 37').

Figure 3:
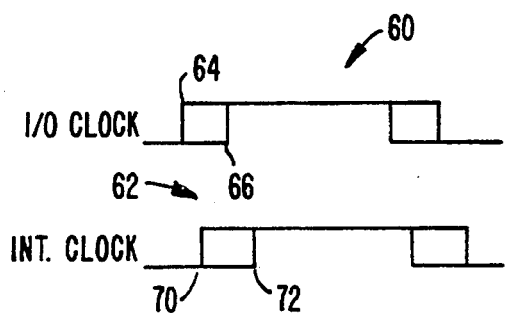
FIG. 3 are timing signals illustrating the delay that will be necessary to communicate data from an input/output device to an internal device according to the teachings of the present invention.

As FIG. 3 illustrates, the I/O clock pulse 60 will, most of the time, lead the internal clock pulse 62, although there may be times when that is not true. In addition, consideration must be given to the "hold time" of the internal device to which information is being transferred (i.e., the minimum time that data must stay valid after receipt of the clock edge that accepts the data in that device). Thus, in order to ensure that information is properly transferred from an I/O clocked device (e.g., flip flop 40) to an internal clocked device (e.g., flip flop 46), the minimum delay exhibited by the delay element 54 is determined by the maximum delay 72 of the internal clock and the maximum hold time for the internal clocked device, from which is subtracted the minimum skew 64 of the I/O clock, and the time it takes for data to be transferred to the data (Q) output of the I/O device of the clock transition, less the minimum delay for data to get from the data output (Q) of the I/O clocked device to the data input (D) of an internal clocked device.

The end result is that the internal clock devices receive information from the I/O clocked devices one clock period after that information is loaded into the I/O clocked device. The imposition of the delay 54 ensures that the data is properly transferred, provided the analysis set forth above is made.

A similar analysis can be made for determining the data transfers from an internal clock device (e.g., device 52) to an I/O clock device (device 42). Since the I/O clock is used for the clock cycle after the data is clocked out by the internal clock, there is at least one clock cycle (assuming the clock skew is small compared to the clock cycle time) for the signals being transferred to settle. Thus, there is no issue on data set up time violation for the I/O clock devices receiving information from the internal clock devices.

What is claimed is:

1. A system for distributing a master clock signal to plurality of clocked devices formed on an integrated circuit chip, the plurality of clocked devices including clocked input/output devices for temporarily storing data communicated between the integrated circuit chip and elements external to the integrated circuit chip, and internal clocked devices, the system comprising:

an input formed on the integrated circuit chip to receive the master clock signal;

a first path formed on the integrated circuit chip proximate the periphery thereof to communicate a first clock signal, the first path being configured as a closed loop;

a second path formed separate from the first path on the integrated circuit chip substantially in a middle portion of the integrated circuit chip, the second path including a trunk path and a number of tributary paths extending from the trunk path;

first clock buffer means intercoupling the input and the first path for communicating the master clock signal to the first path as the first clock signal;

second clock buffer means intercoupling the input and the second path to communicate the master clock signal to the second path as a second clock signal;

first means coupling the first clock signal to the clocked input/output devices; and second means coupling selected ones of the number of tributary paths to corresponding ones of the internal clocked devices.

2. The system of claim 1, wherein the first clock buffer means is configured to operate with and drive a predetermined number of clocked devices coupled to the first path.

3. The system of claim 2, including an actual number of clocked devices operably coupled to the first path, the actual number of clocked devices being less than the predetermined number, and including a plurality circuit devices coupled to the first path, the actual number of clocked devices and plurality of circuit devices being equivalent to the predetermined number of clocked devices.

4. The system of claim 1, wherein the clocked input/output devices are formed proximate the periphery of the integrated circuit chip and the first path.

5. The system of claim 1, wherein the tributary paths are formed on the integrated circuit chip to extend generally laterally of the trunk path.

6. The system of claim 1, wherein the first clock buffer means includes a pair of clock buffer means, each one of the pair of clock means being coupled to the first path at connection points located substantially equidistant from one another along the closed loop.

7. A method of distributing a master clock signal to clocked elements formed on an integrated circuit chip, the clocked elements including input/output devices and internal devices, the method comprising:

forming a closed loop clock communicating path on the integrated chip, the closed loop clock communicating path being formed to follow proximate a periphery of the integrated circuit chip;

forming, separate from the closed loop clock communicating path, a second clock communicating path on the integrated circuit chip circumscribed by the closed loop clock communicating path and, extending from the linear clock communicating path, a plurality of tributary paths;

coupling the master clock to the closed loop clock communicating and second clock communicating paths;

forming the input/output devices on the integrated circuit chip at locations proximate the closed loop clock communicating path, and coupling the input/output devices thereto; and forming the internal devices proximate corresponding ones of the tributary paths, and coupling the internal devices thereto for receiving the master clock signal.

8. The method of claim 7, wherein the second clock communicating path is formed substantially central of the integrated circuit chip.

9. The method of claim 7, wherein the second clock communicating path is formed generally linear and substantially central of the integrated circuit chip.

10. A system for distributing a master clock signal to plurality of clocked devices formed on an integrated circuit chip, the plurality of clocked devices including a number of clocked input/output devices for temporarily storing data communicated between the integrated circuit chip and elements external to the integrated circuit chip, and internal clocked devices coupled to receive data from, or transfer data to, the number of clocked input/output devices, the system comprising:

an input formed on the integrated circuit chip to receive the master clock signal;

a first path formed on the integrated circuit chip proximate the periphery thereof, the first path being configured as a closed loop and coupled to communicate the master clock signal to the number of clocked input/output devices;

a second path formed on the integrated circuit chip separate from the first path interior of the closed loop and coupled to communicate the master clock signal to the internal devices.

11. The system for distributing a master clock signal of claim 10, wherein the second path is linear.

12. The system for distributing a master clock signal of claim 11, wherein the second path is formed substantially central of the integrated circuit chip.

13. The system for distributing a master clock signal of claim 10, wherein the first path is configured to couple the master clock signal to a predetermined plurality of clocked input/output devices greater in number than the number of clocked input/output devices, and including a plurality of dummy circuit devices coupled to the first path, the number of clocked input/output devices and the plurality of dummy circuit devices being equivalent to the predetermined plurality of clock input/output devices.

14. A method of distributing a master clock signal to clocked elements formed on an integrated circuit chip, the clocked elements including input/output devices for receiving data transferred to the integrated circuit chip or for transmitting data transferred from the integrated circuit chip, and internal devices that receive data from, or transmit data to, the input/output devices, the method comprising the steps of:

forming a closed loop path on the integrated chip;

forming a second path on the integrated circuit chip that is separate from the closed loop path and located to have the closed loop path circumscribe the second path;

coupling the master clock to the closed loop path and the second path;

coupling the input/output devices to the closed loop path to receive the master clock signal; and coupling the internal devices to the second path to receive the master clock signal.

15. The method of claim 14, wherein the closed loop path is formed proximate a periphery of the integrated circuit chip.

16. The method of claim 15, wherein the second path is a linear path.

17. The method of claim 16, wherein the linear path has a plurality of tributary paths extending therefrom, each of the plurality of tributary paths coupling a corresponding one of the internal devices to the linear path.

18. The method of claim 14, wherein the step of forming the closed loop path includes forming the closed loop path in a manner that allows a predetermined number of input/output devices to receive and operate from the master clock signal.

19. The method of claim 18, includes the step of forming a number of equivalent input/output devices when an actual number of input/output devices coupled to the closed loop path is less than the predetermined number by the number.

20. The method of claim 17, wherein the linear path is formed on the integrated circuit chip substantially central thereof.

* * * * *